United States Patent [19]

Takayama et al.

[11] Patent Number: 5,364,903

[45] Date of Patent: * Nov. 15, 1994

[54] MOLDED PRODUCTS FROM MOLDING COMPOSITIONS CONTAINING THERMOSETTING (METH)ACRYLATE LIQUID RESINS

[75] Inventors: Yuji Takayama; Hirotaka Wada; Iwao Komiya, all of Aichi, Japan

[73] Assignee: Mitsubishi Rayon Company Limited, Japan

[*] Notice: The portion of the term of this patent subsequent to Feb. 9, 2010 has been disclaimed.

[21] Appl. No.: 930,975

[22] Filed: Aug. 14, 1992

Related U.S. Application Data

[63] Continuation of Ser. No. 568,610, Aug. 16, 1990, abandoned.

[30] Foreign Application Priority Data

Aug. 24, 1989 [JP] Japan .................................. 1-217876
Feb. 26, 1990 [JP] Japan .................................. 2-45139

[51] Int. Cl.$^5$ .................... C08K 3/22; C08F 220/36; C08F 220/26
[52] U.S. Cl. .................... 524/555; 524/437; 525/278; 526/301
[58] Field of Search ............ 526/301; 525/278; 524/555, 437

[56] References Cited

U.S. PATENT DOCUMENTS

| | | | |
|---|---|---|---|
| 2,882,260 | 4/1959 | Bartl et al. | 526/301 |
| 4,528,317 | 7/1985 | Theodore et al. | 525/278 |
| 4,600,761 | 6/1986 | Ruffner et al. | 526/301 |
| 4,721,735 | 1/1988 | Bennett et al. | 524/555 |
| 4,734,454 | 3/1988 | Aihara et al. | 526/301 |
| 4,824,919 | 4/1989 | Baker et al. | 525/455 |
| 4,829,120 | 5/1989 | Yabuta | 524/460 |
| 4,985,340 | 1/1991 | Palazzotto et al. | 528/52 |
| 5,185,417 | 2/1993 | Takayama et al. | 526/301 |

FOREIGN PATENT DOCUMENTS

| | | | |
|---|---|---|---|
| 0197635 | 2/1986 | European Pat. Off. | 524/555 |

*Primary Examiner*—Paul R. Michl
*Assistant Examiner*—Andrew E. C. Merriam
*Attorney, Agent, or Firm*—Heller, Ehrman, White & McAuliffe

[57] ABSTRACT

Thermosetting (meth)acrylate molding liquid resin consisting of a specified type of unsaturated oligourethane and alkyl (meth)acrylate within a specified range of ratio. Such a specified type of unsaturated oligourethane may be obtained by reaction between 2-isocyanatoalkyl (meth)acrylate and polyhydric alcohol or by reacting 2-isocyanatoalkyl (meth)acrylate with polyhydric alcohol at molar ratio of functional groups NCO/OH between 1.1 and 1.6 to form a urethane compound and reacting hydroxyalkyl (meth)acrylate with a residual portion of 2-isocyanatoalkyl (meth)acrylate at molar ratio of functional groups OH/NCO between 1.0 and 1.5. This invention also includes molding compositions containing such liquid resin and a specified type of inorganic filler and/or a certain type of thermoplastic high molecular compound as well as molded objects obtained by curing such compositions in a mold.

10 Claims, No Drawings

MOLDED PRODUCTS FROM MOLDING COMPOSITIONS CONTAINING THERMOSETTING (METH)ACRYLATE LIQUID RESINS

This is a continuation of application Ser. No. 07/568,610 filed Aug. 16, 1990, now abandoned.

BACKGROUND OF THE INVENTION

This invention relates to molded products obtained by curing a molding composition containing thermosetting (meth)acrylate liquid resins.

Unsaturated polyester resins are representative examples of thermosetting liquid resins. There are many molding methods for obtaining molded objects by curing compositions which contain such unsaturated polyester resins, including the compression method, the injection method, the hand lay-up method, the pultrusion method and also the resin transfer molding (RTM) and reaction injection molding (RIM) methods which are considered most ideal and economical.

Unsaturated polyester resins with low viscosity, however, are hard to obtain. If a composition is prepared by adding an inorganic filler to such a resin, its viscosity tends to increase significantly. If a molding composition has a high viscosity, it takes a long time to transfer it into a mold. If one attempts to prevent such an unreasonable increase in viscosity, this necessarily limits the amount of organic fillers that can be added. Another problem with unsaturated polyester resins is that, since they are made from phthalic acids or bisphenols and styrene is used as reaction dilutant (solvent), the content of aromatic hydrocarbons is high and hence that black smoke tends to be copiously generated when a molded object made from such unsaturated polyester resins is burnt. Methods for providing flame resistance to unsaturated polyester resin include the method of additionally using a water-containing inorganic filler such as aluminum hydroxide ($Al_2O_3 \cdot 3H_2O$), the method of using so-called flame-resistant unsaturated polyesters combining halogens, the method of adding a halogen-containing antiflame agent to a mixture of unsaturated polyester resin and a water-containing inorganic filler, and also the method of adding antimony trioxide in order to enhance the flame-resistant effect of a halogen. As long as unsaturated polyester resins are used, however, generation of a large amount of black smoke is inevitable by any of these methods when a molded object is burnt. It has been well known that the generation of such black smoke in large quantity makes it difficult for people to escape from the site of a fire and hence serves as the most serious cause of deaths at the time of a fire.

In order to solve this problem with prior art unsaturated polyester resins, U.S. Pat. No. 4,480,079 and EP197682 disclosed liquid resins composed of unsaturated urethane obtained from polymethylene polyphenyl polyisocyanate and hydroxy alkyl (meth)acrylate and alkyl (meth)acrylate. Because of the use of unsaturated urethane obtained from polymethylene polyphenyl polyisocyanate and hydroxy alkyl (meth)acrylate, however, such liquid resins have the following problems. Firstly, black smoke is still generated copiously when a molded object therefrom is burnt. If a composition containing a large amount of water-containing inorganic filler is used in order to prevent it, its viscosity becomes high and it affects the molding process adversely. Secondly, although use is made of compositions containing thermoplastic high molecular compound as a low profile agent, the effects of such thermoplastic high molecular compounds are weak at the time of molding.

SUMMARY OF THE INVENTION

It is therefore an object of the present invention to provide molding liquid resins with which the problems described above can be solved.

It is another object of the present invention to provide molding compositions containing such liquid resins with an inorganic filler and/or thermoplastic high molecular compound as a low profile agent.

It is still another object of the present invention to provide molded objects obtained by curing such compositions in a mold.

This invention has been accomplished by the present inventors who, in view of the aforementioned objects diligently researched molding liquid resins comprising unsaturated urethane and alkyl (meth)acrylate, molding compositions containing such liquid resins, inorganic filler and/or thermoplastic high molecular compounds as low profile agent, and molded objects obtained by curing such compositions in a mold, thereby discovering that use as unsaturated urethane should be made of unsaturated oligourethane of a specified kind at a specified ratio.

DETAILED DESCRIPTION OF THE INVENTION

Roughly speaking, the present invention relates to molded products obtained by curing molding compositions containing either of the following two kinds of liquid resins and a specified amount of inorganic filler and/or thermoplastic high molecular compound. The first of these two kinds of molding liquid resins is characterized as being thermosetting (meth)acrylate liquid resins containing what is hereinafter referred to as unsaturated oligourethane of a first kind, or unsaturated oligourethane (I), and alkyl (meth)acrylate at the weight ratio (Unsaturated oligourethane (I))/(Alkyl (meth)acrylate) in the range of (20–80)/(80–20), where unsaturated oligourethane (I) is characterized as being obtained by reacting 2-isocyanatoalkyl (meth)acrylate with a polyhydric alcohol. The second kind of liquid resins according to the present invention is characterized as being thermosetting (meth)acrylate liquid resins containing what is hereinafter referred to as unsaturated oligourethane of a second kinds, or unsaturated oligourethane (II), and alkyl (meth)acrylate at the weight ratio (Unsaturated oligourethane (I))/(Alkyl (meth)acrylate) in the range of (20–80)/(80–20), where unsaturated oligourethane (II) is characterized as being obtained by reacting 2-isocyanatoalkyl (meth)acrylate with a polyhydric alcohol at molar ratio of functional groups (NCO/OH) in the range of 1.1–1.6 to form urethane compound and then reacting hydroxyalkyl (meth)acrylate with an excess portion of this 2-isocyanatoalkyl (meth)acrylate at the molar ratio of functional groups (OH/NCO) in the range of 1.0–1.5.

According to the present invention, aforementioned unsaturated oligourethane (I) is obtained by reacting 2-isocyanatoalkyl (meth)acrylate and polyhydric alcohol.

Examples of 2-isocyanatoalkyl (meth)acrylate include 2-isocyanatoethyl methacrylate, 2-isocyanatoethyl acrylate, 2-isocyanatopropyl acrylate and 2- isocyanatopropyl acrylate. They may be used singly or as a mixed system of two or more kinds, but 2-isocyanatoethyl methacrylate and 2-isocyanatoethyl acrylate are particularly preferable.

Examples of aforementioned polyhydric alcohol include (1) dihydric alcohols such as ethylene glycol and propylene glycol, (2) trihydric alcohols such as glycerine, trimethylol ethane, 5-methyl-1,2,4-heptane triol and 1,2,6-hexane triol, and (3) tetrahydric alcohols such as pentaerythritol. These may be used singly or as a mixed system of two or more kinds but glycerine is particularly preferable.

Unsaturated oligourethane (I) obtainable according to the present invention if use is made of isocyanatoethyl (meth)acrylate as 2-isocyanatoalkyl (meth)acrylate may be for the following form:

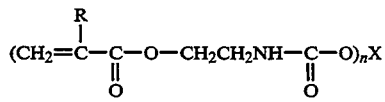

where R is H or $CH_3$, X is a residual group obtained by removing a hydroxy group from a polyhydric alcohol and n is the number of hydroxy groups in the polyhydric alcohol.

Unsaturated oligourethane (I) can be easily produced by an ordinary method. It may be produced, for example, by mixing saturated polyhydroxy compound with alkyl (meth)acrylate, adding a small amount of di-n-butyl tin laurate as reaction catalyst to prepare a mixed solution, and adding 2-isocyanatoalkyl (meth)acrylate thereto such that the molar ratio of functional groups (NCO/OH) of 2-isocyanatoalkyl (meth)acrylate and polyhydric alcohol will normally become 0.9–1.2 for a reaction at a temperature of 25°–55° C.

If there is residual polyhydric alcohol in this reaction, the physical characteristics of the molded final product may not be sufficiently satisfactory. In order to avoid such occurrences, the hydroxy groups of polyhydric alcohol must react sufficiently so as to be completely used up. For this purpose, it is preferable to use an excessive amount of 2isocyanatoalkyl (meth)acrylate with respect to polyhydric alcohol for the reaction therebetween and then to react an equivalent or an excessive amount of hydroxyalkyl (meth)acrylate with the residual portion of 2-isocyanatoalkyl (meth)acrylate. In this situation, the molar ratio of functional groups (NCO/OH) between reacting 2-isocyanatoalkyl (meth)acrylate and polyhydric alcohol is adjusted within the range of 1.1–1.6 and that (OH/NCO) for the reaction between hydroxyalkyl (meth)acrylate and the residual portion of 2-isocyanatoalkyl (meth)acrylate is adjusted within the range of 1.0–1.5 and more preferably 1.0–1.2. What is thus obtained is aforementioned unsaturated oligourethane (II).

Representative examples of the hydroxyalkyl (meth)acrylate which is used for obtaining unsaturated urethane (II) include 2-hydroxyethyl methacrylate, 2-hydroxyethyl acrylate, 2-hydroxypropyl methacrylate and 2-hydroxypropyl acrylate. They may be used singly or as a mixed system of two or more kinds but the use of 2-hydroxyethyl methacrylate is particularly preferable.

In the present invention, alkyl (meth)acrylates include alkyl acrylates and alkyl methacrylates. The alkyl group may be methyl group, ethyl group or propyl group. Thus, examples of alkyl (meth)acrylate include methyl methacrylate, ethyl methacrylate, methyl acrylate and ethyl acrylate. They may be used singly or as a mixed system with two or more kinds. Particularly preferable among them is methyl methacrylate.

The molding liquid resins according to the present invention contains aforementioned unsaturated oligourethane (I) or (II) and alkyl (meth)acrylate such that the weight ratio (Unsaturated oligourethane (I) or (II))/(Alkyl (meth)acrylate)=(20–80)/(80–20), or more preferably (30–60)/(70–40). This is because molded objects with superior physical characteristics can be eventually obtained from compositions containing such liquid resins. As mentioned above, alkyl (meth)acrylates can be used as solvent when aforementioned unsaturated oligourethane (I) or (II) is synthesized and, in this manner, not only can unsaturated oligourethane (I) or (II) be produced but also liquid resins embodying the present invention are thereby obtained.

The molding compositions according to the present invention may be characterized as containing both liquid resins of the present invention and inorganic filler. Since the liquid resins embodying the present invention have lower viscosity than do the conventional types of unsaturated polyester resins or unsaturated urethane resins, a relatively large amount of inorganic filler can be added when the compositions of the present invention are prepared. The amount of such inorganic filler that can be contained is 30 weight parts or over per 100 weight parts of liquid resins embodying the present invention.

The molding compositions according to the present invention may also be characterized as containing liquid resins of the present invention and thermoplastic high molecular compounds serving as low profile agent. In order to achieve a desired low shrinkage effect while avoiding undesirable effects, the amount of thermoplastic high molecular compound to be contained should be 1–35 weight parts per 100 weight parts of liquid resins embodying the present invention.

The molding compositions according to the present invention may further be characterized as containing liquid resins of the present invention, inorganic filler and thermoplastic high molecular compounds. In order to achieve both desired flame-resisting and low shrinkage effects without other undesirable effects, the amounts of inorganic filler and thermoplastic high molecular compounds to be contained when these compositions are prepared should respectively 30–300 weight parts and 1–35 weight parts per 100 weight parts of liquid resins embodying the present invention.

Examples of preferred inorganic filler to be used for providing flame-resistance in the compositions according to the present invention include aluminum hydroxide ($Al_2O_3 \cdot 3H_2O$) and calcium sulfate hydrate ($CaSO_4 \cdot 2H_2O$). They may be used either singly or as a mixed system.

The thermoplastic high molecular compounds for use as low profile agent in the compositions according to the present invention are those that can dissolve or swell in alkyl (meth)alkylates. There are many kinds of such low profile agent but those having glass transition temperature of less than 100° C. are desirable. Examples of such thermoplastic high molecular compound include polyvinyl acetate, copolymers of methyl methacrylate and alkyl acrylate, block copolymers of polyesters and polybutadiene, block copolymers of vinyl acetate and styrene, and block copolymers of vinyl acetate and methyl methacrylate. They may be used singly or as a mixed system of two or more.

The present invention is not particularly limited by the order in which the individual constituents of the composition embodying the present invention should be prepared. When use is made of thermoplastic high molecular compounds as low profile agent, for example, it does not matter whether the thermoplastic high molecular compounds are directly added to liquid resins or a solution of alkyl (meth)acrylate and thermoplastic high molecular compounds is mixed with liquid resins.

Molded objects according to the present invention are characterized as being obtained by curing a composition embodying the present invention in a mold. For the curing process, procedures for compositions of unsaturated polyester resins may be adopted. For example, many kinds of curing agent and curing accelerator may be used for radical polymerization. Examples of curing agent that can be used for this purpose include benzoyl peroxide, t-butyl peroxy-2-ethylhexanoate, t-butyl peroxybenzoate, 1,1-di-t-butylperoxy-3,3,5-trimethyl cyclohexane, and bis(4-t-butylcyclohexyl) peroxy dicarbonate. These may be used either singly or as a mixed system of two or more. Examples of curing accelerator include tertiary amines such as N,N-dimethyl-p-toluidine and N,N-dimethyl aniline. The curing agent is usually used at a rate of 1–5 weight % with respect to the composition of the present invention as a whole. A release agent may be used when molding is done by curing. Examples of release agent includes metallic soap such as zinc stearate and Zelec UN (trade name for phosphate by E. I. Dupont).

Compositions according to the present invention can be cured and molded easily by a molding method such as the pultrusion method, the BMC method, the press molding method and the resin transfer molding method.

EXAMPLES

In what follows, the present invention will be further described by way of examples but these examples are not intended to limit the scope of the present invention.

Series 1

Test Example 1

(Synthesis of unsaturated oligourethane (I)-A)

Glycerine (11.0 g=0.120 mol), methyl methacrylate (43.8 g) and di-n-butyl tin dilaurate (0.3 g) were placed inside a reactor and maintained at 50° C. Into this, 2-isocyanatoethyl methacrylate (54.7 g=0.353 mol) was gradually added for sustaining a reaction. Heat of reaction is thereby generated but the interior of the reactor was maintained at 50°–60° C. Thereafter, the reaction was continued for 1 hour at 50°–55° C. to complete the reaction and to obtain a uniform liquid resin (Test Example 1) containing 60% (by weight) of unsaturated oligourethane (I)-A. The molar ratio of functional groups (NCO/OH) of glycerine and 2-isocyanatoethyl methacrylate for this reaction was 0.98.

Test Example 5

(Synthesis of unsaturated oligourethane (II)-A)

Glycerine (11.0 g=0.120 mol), methyl methacrylate (60.3 g) and di-n-butyl tin dilaurate (0.3 g) were placed inside a reactor. Into this, 2-isocyanatoethyl methacrylate (66.5 g=0.429 mol) was gradually added and the interior was maintained at 50°–55° C. for one hour to form urethane compounds. Next, 2-hydroxyethyl methacrylate (12.6 g=0.097 mol) was added in order to remove 2-isocyanatoethyl methacrylate remaining in the reaction liquid. Thereafter, the reaction was continued for 1 hour at 50° C. to complete the reaction and to obtain a uniform liquid resin (Test Example 5) containing 60% of unsaturated oligourethane (II)-A. The molar ratio of functional groups (NCO/OH) of glycerine and 2-isocyanatoethyl methacrylate for the first reaction was 1.2. The molar ratio of functional groups (OH/NCO) of 2-hydroxyethyl methacrylate and the excess portion of 2-isocyanatoethyl methacrylate for the latter reaction was 1.4.

Comparison Example 1

(Synthesis of unsaturated urethane R)

According to the method described in U.S. Pat. No. 4,480,079, polymethylene polyphenyl polyisocyanate (with 3.5 NCO groups per molecule; 55.9 g=0.125 mol), 2-hydroxyethyl methacrylate (73.0 g=0.562 mol), methyl methacrylate (85.5 g) and di-n-butyl tin dilaurate (0.39 g) were placed inside a reactor for a reaction at 40° C. for 2 hours to complete a reaction and to thereby obtain a uniform liquid resin (Comparison Example 1) containing unsaturated oligourethane R by 60%.

Additionally, liquid resins (Test Examples 2–4) according to the present invention, respectively containing by 60 weight % (I)-B, (I)-C and (I)-D, which are different kinds of unsaturated oligourethane (I), were obtained similarly to the synthesis of aforementioned unsaturated oligourethane (I)-A. Likewise, liquid resins (Test Examples 6–14), respectively containing by 60 weight % (II)-B, (II)-C, (II)-D, (II)-E, (II)-F, (II)-G, (II)-H, (II)-I and (II)-J which are different kinds of unsaturated oligourethane (II), were obtained similarly to the synthesis of aforementioned unsaturated oligourethane (II)-A.

Table 1 shows the types of 2-isocyanatoalkyl (meth)acrylate and polyhydric alcohols used for the syntheses, the molar ratios of functional groups (NCO/OH) in the reactions between unsaturated monoisocyanate and polyhydric alcohols and the molar ratios of functional groups (OH/NCO) of hydroxyalkyl (meth)acrylate and residual 2-isocyanatoalkyl (meth)acrylate in the later reaction. In all syntheses of unsaturated oligourethane (II)-B through (II)-J, use as hydroxyalkyl (meth)acrylate was made of 2-hydroxyethyl methacrylate as done in the case of unsaturated oligourethane (II)-A. In Table 1, IEM and IEA respectively indicate 2-isocyanatoethyl methacrylate and 2-isocyanatoethyl acrylate, 1 indicates an mixture of polytetramethylene glycol with average molecular weight of 1300 and glycerine at weight ratio of 59.5/125 and 2 indicates a mixture of polypropylene succinate (with hydroxyl group at both ends and average molecular weight of 650) and glycerine at weight ratio of 11/20.4.

Series 2

Compositions (Test Examples 15–20 and Comparison Examples 2–7) were prepared by adding aluminum hydroxide (Al$_2$O$_3$.3H$_2$O) with particle size of 17 μm serving as inorganic filler to 100 weight parts respectively of liquid resins (Test Examples 1, 8 and 9 and Comparison Example 1) obtained in Series 1 as well as to commercially available unsaturated polyester resins according to the rates shown in Table 2 and their viscosity was measured by using a Brookfield viscometer (Model HB) at 25° C. and 50 rpm. In Table 2 and thereafter, Test and Comp respectively indicate Test Example and Comparison Example, 3 indicates unsaturated polyester resin Polymal produced by Takeda Yakuhin Kogyo, and 4 indicates unsaturated urethane resin Modar 835 produced by I.C.I. Corporation. Viscosity (cps at 25° C.) of the liquid resins shown in Table 2 was 62 for Test Example 1, 58 for Test Examples 8 and 9, 92 for Comparison Example 1, 850 for 3 and 105 for 4.

Benzoyl peroxide (1.5 weight parts) as curing agent, N, N-dimethyl-p-toluidine (0.075 weight parts) as curing accelerator and Zelec UN produced by E. I. Dupont (1.0 weight part) as release agent were added to each of these prepared compositions and they were individually poured into a mold having two glass sheets (25×25 cm) of thickness 5 mm with a clearance of 3 mm therebetween to be cured for one hour at 25° C. and then for 10 hours at 80° C. to obtain molded objects of thickness 3 mm. The molded objects thus obtained were cut to a length of 70 mm and a width of 6.5 mm to be used for combustion tests according to Method A of JIS (Japanese Industrial Standards) K-6911 to visually evaluate the generated smoke according to the following standards:

A: No inflammation and no black smoke generated;
B: Inflammation but no black smoke generated;
C: No inflammation but black smoke observed;
D: Inflammation with copious generation of black smoke.

The results of measurements and observations are also shown in Table 2, which clearly shows that each composition according to the present invention has lower viscosity than prior art compositions and that the molded products from the compositions according to the present invention do not generate black smoke. It was also noted that the surfaces of the molded products from compositions of Comparison Examples 4 and 5 were very rough because these compositions were highly viscous and had to be forced into the mold.

Series 3

Compositions (Test Examples 21–22 and Comparison Examples 8–9) were prepared by adding 42 weight parts of aluminum hydroxide ($Al_2O_3.3H_2O$) with particle size of 8 μm serving as inorganic filler, 1.0 weight part of bis(4-t-butylcyclohexyl) peroxy dicarbonate and 1.0 weight part of t-butyl peroxy benzoate serving as curing agents and 1.5 weight parts of Zelec UN produced by E. I. Dupont as release agent to 100 weight parts respectively of liquid resins (Test Examples 1 and 9 and Comparison Example 1) obtained in Series 1 as well as to commercially available unsaturated polyester resins and their viscosity was measured as done in Series 2.

Each composition thus prepared was also used to produce molded products by a pultrusion method. The total length of the mold in the pultrusion apparatus was 42 cm and its cavity size was 26.35×3.2 mm. The molding temperature was 120° C. in the front part of the mold and 150° C. in its rear part. Use as glass robing was made of 15 pieces of PER-463-RD2 produced by Nippon Sheet Glass Corporation and the speed of pultrusion was varied to 27, 38, 49, 60, 71, 82 and 93 cm/min. The highest speed of pultrusion at which insufficient impregnation of liquid resin to glass robing or insufficient curing of liquid resin did not take place was considered as the highest pultrusion speed. The results of these measurements are shown in Table 3.

Additionally, compositions (Test Examples 23 and 24 and Comparison Examples 10 and 11) were prepared similarly as above except the contents of aluminum hydroxide ($Al_2O_3.3H_2O$) were changed to 50 weight parts per 100 weight parts of the liquid resins. These compositions were used to produce molded products at two pultrusion speeds of 50 and 80 cm/min. The other conditions of the molding were identical to those described above. Overall external appearance of the molded products thus obtained was visually inspected by paying particular attention to the existence of insufficient impregnation of liquid resins to the glass robing, insufficient curing and cracks. The results are shown in Table 4.

Series 4

The liquid resins obtained in Series 1 (Test Examples 1 and 8 and Comparison Example 1) were mixed with a solution of low profile agent as shown in Table 5. Benzoyl peroxide (1 weight part), zinc stearate (4 weight parts) and calcium carbonate produced by Nitto Funka Kogyo, Inc. (186 weight parts) were added to 100 weight parts of each of the liquid mixtures thus obtained. A kneader for BMC (bulk molding composition) was used for mixing to prepare compositions (Test Examples 25–32 and Comparison Examples 12–16). Each of these compositions thus prepared was in the form of a pastelike premix.

Molded objects were produced from these premixes by using a mold for SMC and a compression molding apparatus at mold temperature of 80° C. for one minute. For each molded object thus produced, linear shrinkage was calculated by the formula: Linear shrinkage (%)={(Longitudinal dimension of mold)−(Longitudinal dimension of molded product)}×100/(Longitudinal dimension of mold). The results of this calculation are also shown in Table 5. In Table, "a" indicates a solution with 30 weight parts of polymethyl methacrylate Acrypet produced by Mitsubishi Rayon Company Limited dissolved in 70 weight parts of methyl methacrylate, and "b" indicates a solution of a mixture having 25 weight parts of vinyl polyacetate, 60 weight parts of methyl methacrylate and 15 weight parts of ethyl acrylate.

Series 5

Still further compositions (Test Examples 33 and 34 and Comparison Example 17) were prepared by mixing 30 weight parts of a low profile agent solution obtained by dissolving 33 weight parts of polystyrene in 67 weight parts of methyl methacrylate, 150 weight parts of aluminum hydroxide ($Al_2O_3.3H_2O$) with average particle size of 8 μm as inorganic filler, 10 weight parts of methyl methacrylate as dilutant, 1.1 weight parts of bis(4-t-butylcyclohexyl) peroxy dicarbonate and 1.1 weight parts of t-butyl peroxy benzoate as curing agents, and 7 weight parts of Zelec UN produced by E. I. Dupont as release agent respectively with 70 weight parts of Test Examples 1 and 14 obtained in Series 1 and commercially available unsaturated urethane resin. Viscosity of these compositions was measured as in Series 2.

Each composition thus prepared was also used to produce molded products by a pultrusion method. The total length of the mold in the pultrusion apparatus was 42 cm and its cavity size was 26.35×3.2 mm. The mold temperature was 90° C. The same 15 pieces of glass robing as used in Series 3 were used and the speed of pultrusion was as shown in Table 6. Linear shrinkage rate for each of these compositions was calculated in a direction perpendicular to the direction of the robing by the formula: Line shrinkage (%) = {26.35 − (Length in mm of molded product in direction perpendicular to robing)} × 100/26.35.

As can be understood from the Tables, compositions according to the present invention can be molded by easy operations and have the advantages in that low profile agents can be effective and that molded products produced therefrom do not generate black smoke.

TABLE 1

| Test Example | Illustrated Oligourethane | 2-isocyanatoalkyl (meth)acrylate | Polyhydric Alcohol | Ratio NCO/OH | Ratio OH/NCO |
|---|---|---|---|---|---|
| 1 | (I)-A | IEM | Glycerine | 0.98 | — |
| 2 | (I)-B | IEM | Glycerine | 1.02 | — |
| 3 | (I)-C | IEA | Pentaerythritol | 1.0 | — |
| 4 | (I)-D | IEA | Trimethylol Propane | 0.95 | — |
| 5 | (II)-A | IEM | Glycerine | 1.1 | 1.0 |
| 6 | (II)-B | IEM | Glycerine | 1.1 | 1.1 |
| 7 | (II)-C | IEM | Glycerine | 1.2 | 1.0 |
| 8 | (II)-D | IEM | Glycerine | 1.2 | 1.2 |
| 9 | (II)-E | IEM | Glycerine | 1.4 | 1.4 |
| 10 | (II)-F | IEM | Bisphenol A | 1.2 | 1.2 |
| 11 | (II)-G | IEM | Diethylene Gycol | 1.2 | 1.2 |
| 12 | (II)-H | IEM | Pentaerythritol | 1.4 | 1.4 |
| 13 | (II)-I | IEM | *1 | 1.2 | 1.4 |
| 14 | (II)-J | IEM | *2 | 1.1 | 1.2 |

TABLE 2

| Example | Liquid Resins | Weight Parts of Aluminum Hydroxide | Viscosity of Composition (cps at 25° C.) | Smoke |
|---|---|---|---|---|
| Test 15 | Test 1 | 40 | 90 | B |
| Test 16 | Test 1 | 100 | 275 | A |
| Test 17 | Test 8 | 40 | 84 | B |
| Test 18 | Test 8 | 100 | 265 | A |
| Test 19 | Test 9 | 40 | 82 | B |
| Test 20 | Test 9 | 100 | 260 | A |
| Comp 2 | Comp 1 | 40 | 140 | D |
| Comp 3 | Comp 1 | 100 | 440 | C |
| Comp 4 | *3 | 50 | 2430 | D |
| Comp 5 | *3 | 100 | 7130 | D |
| Comp 6 | *4 | 40 | 180 | D |
| Comp 7 | *4 | 100 | 570 | C |

TABLE 3

| Example | Liquid Resins | Viscosity of Composition (cps at 25° C.) | Highest Pultrusion Speed (cm/min) |
|---|---|---|---|
| Test 21 | Test 1 | 107 | 82 |
| Test 22 | Test 9 | 94 | 82 |
| Comp 8 | Comp 1 | 210 | 60 |
| Comp 9 | *3 | 2750 | 38 |

TABLE 4

| Example | Liquid Resins | Viscosity of Composition (cps at 25° C.) | Condition of Molded Product Pultrusion (cm/min) 50 | 80 |
|---|---|---|---|---|
| Test 23 | Test 1 | 135 | excellent | good |
| Test 24 | Test 9 | 120 | excellent | good |
| Comp 10 | R | 275 | good | poor |
| Comp 11 | *3 | 3500< | poor | poor |

TABLE 5

| Example | Liquid Resins Type | Weight Part | Solution of low Profile Agent Type | Weight Part | Linear Shrinkage (% 0) |
|---|---|---|---|---|---|
| Test 25 | Test 1 | 80 | a | 20 | 0.70 |
| Test 26 | Test 1 | 70 | a | 30 | 0.62 |
| Test 27 | Test 1 | 60 | a | 40 | 0.55 |
| Test 28 | Test 1 | 50 | a | 50 | 0.53 |
| Test 29 | Test 8 | 80 | b | 20 | 0.70 |
| Test 30 | Test 8 | 70 | b | 30 | 0.59 |
| Test 31 | Test 8 | 60 | b | 40 | 0.49 |
| Test 32 | Test 8 | 50 | b | 50 | 0.40 |
| Comp 12 | Comp 1 | 100 | a | 0 | 1.21 |
| Comp 13 | Comp 1 | 80 | a | 20 | 0.93 |
| Comp 14 | Comp 1 | 70 | a | 30 | 0.86 |
| Comp 15 | Comp 1 | 80 | b | 20 | 0.93 |
| Comp 16 | Comp 1 | 70 | b | 30 | 0.78 |

TABLE 6

| Example | Liquid Resins | Viscosity of Composition (cps at 25° C.) | Speed of Pultrusion (cm/min) | Linear Shrinkage (%) |
|---|---|---|---|---|
| Test 33 | Test 1 | 1500 | 80 | 1.20 |
| Test 34 | Test 14 | 1850 | 80 | 1.67 |
| Comp 17 | *4 | 2450 | 40 | 2.75 |

What is claimed is:

1. A molded product obtained by curing a molding composition containing liquid resin and at least 30 weight parts of inorganic filler per 100 weight parts of said liquid resin, said liquid resin consisting of:
   20-80 weight % of unsaturated oligourethane obtained by reaction between 2-isocyanatoalkyl (meth)acrylate and polyhydric alcohol, and
   80-20 weight % of alkyl (meth) acrylate.

2. The molded product of claim 1 wherein said inorganic filler contains at least one selected from the group consisting of aluminum hydroxide and calcium sulfate hydrate.

3. A molded product obtained by curing a molding composition containing liquid resin and at least 30 weight parts of inorganic filler per 100 weight parts of said liquid resin, said liquid resin consisting of:
   20-80 weight % of unsaturated oligourethane obtained by reacting 2-isocyanatoalkyl (meth)acrylate with polyhydric alcohol at molar ratio of functional groups NCO/OH between 1.1-6 to form a urethane compound and reacting hydroxyalkyl (meth)acrylate with a residual portion of said 2-isocyanatoalkyl (meth)acrylate at molar ratio of functional groups OH/NCO between 1.0-1.5 and 80–20 weight % of alkyl (meth)acrylate.

4. The molded product of claim 3 wherein said inorganic filler contains at least one selected from the group consisting of aluminum hydroxide and calcium sulfate hydrate.

5. A molded product obtained by curing a molding composition containing liquid resin and 1–35 weight parts of thermoplastic high molecular compound per 100 weight parts of said liquid resin, said thermoplastic high molecular compound being capable of dissolving in or swelling by impregnating alkyl (meth)acrylate, said liquid resin consisting of:
- 20–80 weight % of unsaturated oligourethane obtained by reaction between 2-isocyanatoalkyl (meth)acrylate and polyhydric alcohol, and
- 80–20 weight % of alkyl (meth)acrylate.

6. The molded product of claim 5 wherein said molding composition further contains no more than 300 weight parts of inorganic filler per 100 weight parts of said liquid resin.

7. The molded product of claim 6 wherein said inorganic filler contains at least one selected from the group consisting of aluminum hydroxide and calcium sulfate hydrate.

8. A molded product obtained by curing a molding composition containing liquid resin and 1–35 weight parts of thermoplastic high molecular compound per 100 weight parts of said liquid resin, said thermoplastic high molecular compound being capable of dissolving in or swelling by impregnating alkyl (meth)acrylate, said liquid resin consisting of:
- 20–80 weight % of unsaturated oligourethane obtained by reacting 2-isocyanatoalkyl (meth)acrylate with polyhydric alcohol at molar ratio of functional groups NCO/OH between 1.1–1.6 to form a urethane compound and reacting hydroxyalkyl (meth)acrylate with a residual portion of said 2-isocyanatoalkyl (meth)acrylate at molar ratio of functional groups OH/NCO between 1.0–1.5, and
- 80–20 weight % of alkyl (meth)acrylate.

9. The molded product of claim 8 wherein said molding composition further contains no more than 300 weight parts of inorganic filler per 100 weight parts of said liquid resin.

10. The molded product of claim 9 wherein said inorganic filler contains at least one selected from the group consisting of aluminum hydroxide and calcium sulfate hydrate.

* * * * *

UNITED STATES PATENT AND TRADEMARK OFFICE
CERTIFICATE OF CORRECTION

PATENT NO. : 5,364,903
DATED : November 15, 1994
INVENTOR(S) : Takayama et al.

It is certified that error appears in the above-indentified patent and that said Letters Patent is hereby corrected as shown below:

Column 10, line 64 in Claim 3:
  replace "tional groups NCO/OH between 1.1-6 to form a"

with:
--tional groups NCO/OH between 1.1-1.6 to form a--

Column 10, line 68 in Claim 3:
  replace "functional groups OH/NCO between 1.0-1.5 and"

with:
--functional groups OH/NCO between 1.0-1.5, and--

Signed and Sealed this

Twenty-eighth Day of May, 1996

Attest:

BRUCE LEHMAN

*Attesting Officer*           *Commissioner of Patents and Trademarks*

UNITED STATES PATENT AND TRADEMARK OFFICE
CERTIFICATE OF CORRECTION

PATENT NO. : 5,364,903
DATED : November 15, 1994
INVENTOR(S) : Takayama et al.

It is certified that error appears in the above-indentified patent and that said Letters Patent is hereby corrected as shown below:

On the title page item,

[73] Assignee:
replace: "Mitsubishi Rayon Company Limited, Japan"

with:
--Mitsubishi Rayon Company Limited, Japan; Takemoto Yushi Kabushiki Kaisha, Japan; Fukui Gyomo Kabushiki Kaisha, Japan--

Signed and Sealed this

Twentieth Day of August, 1996

Attest:

BRUCE LEHMAN

Attesting Officer

Commissioner of Patents and Trademarks